March 18, 1958
A. CURIONI
2,827,001
MACHINE FOR CUTTING SPAGHETTI
Filed July 12, 1954
3 Sheets-Sheet 1
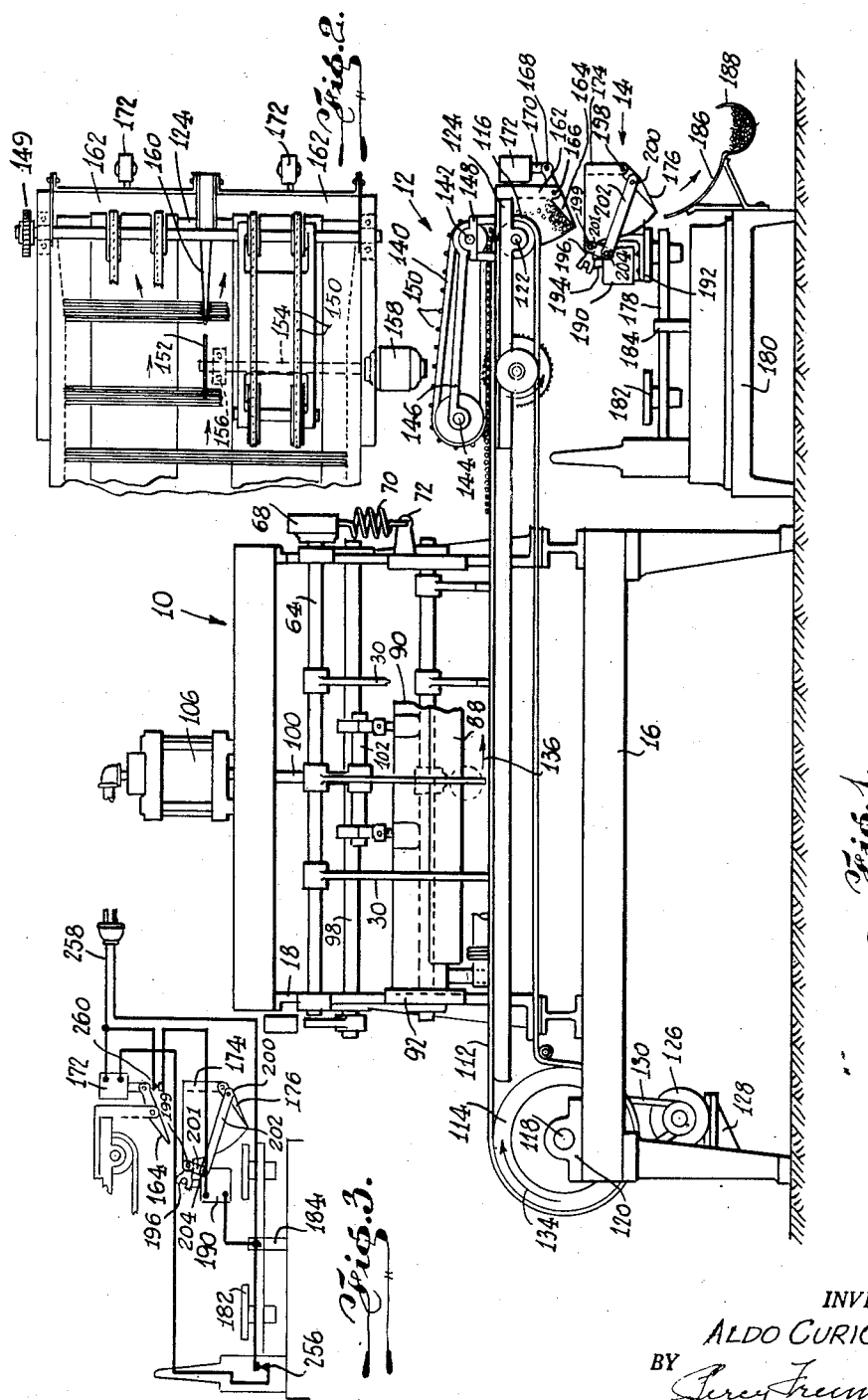
INVENTOR.
ALDO CURIONI
BY
ATTORNEY

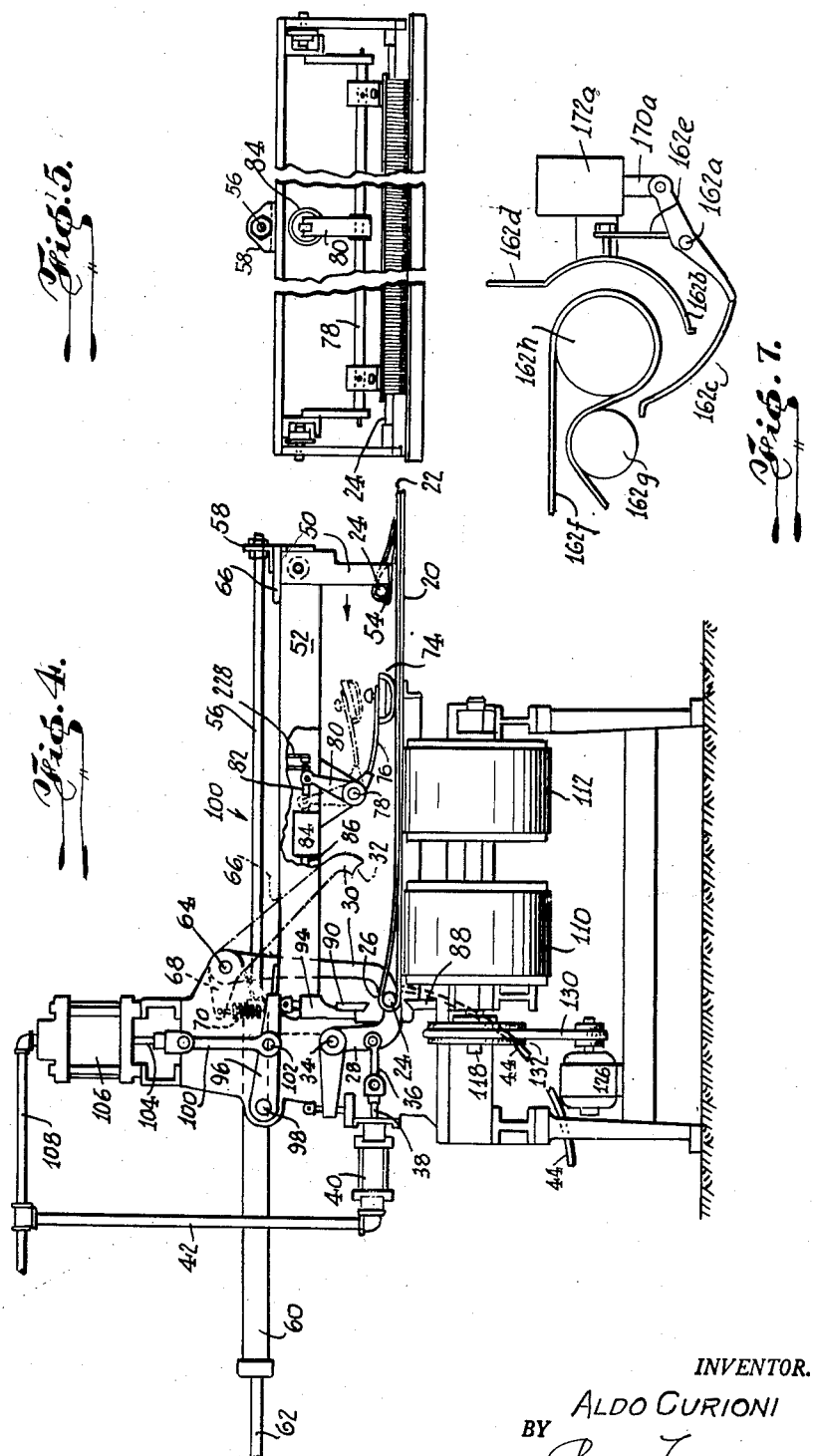

March 18, 1958  A. CURIONI  2,827,001
MACHINE FOR CUTTING SPAGHETTI
Filed July 12, 1954  3 Sheets-Sheet 3

INVENTOR.
ALDO CURIONI
BY Percy Freeman
ATTORNEY.

United States Patent Office 2,827,001
Patented Mar. 18, 1958

2,827,001

MACHINE FOR CUTTING SPAGHETTI

Aldo Curioni, Ridgefield Park, N. J., assignor to himself and Frank Mariani, New York, N. Y., jointly Application July 12, 1954, Serial No. 442,531

5 Claims. (Cl. 107—21)

This invention relates to a machine for cutting and weighing spaghetti to package size and weight.

This invention constitutes an improvement over the invention which is disclosed and claimed in my co-pending patent application Serial No. 280,130, filed on April 2, 1952, now Patent No. 2,775,215 dated December 25, 1956.

The packaging of spaghetti and similar food products is, at the present time, done by hand. The spaghetti is cut to package length and it is then picked up by hand, measured or weighed out and packaged by hand. From a production point of view, to save time and handling expenses, and for sanitary and hygienic reasons, it is desirable to eliminate as much as possible of the manual handling of spaghetti which now takes place in cutting and packaging operations.

It is also difficult, if not impossible, to cut spaghetti to substantially identical package lengths with the apparatus and methods currently in use in the spaghetti making industry. It is important that the spaghetti be cut to uniform lengths for at least two reasons. In the first place, when some of the strands of spaghetti are relatively long and others are relatively short and still others are of average length, a package for the same must be long enough to accommodate the longest strands. Spaghetti of consistently uniform length would require a shorter package. In the second place, spaghetti is frequently measured out in package weights or quantities by simply counting out a predetermined number of strands of package length. When these strands are of uniform length, the end result will be a package containing spaghetti of precise, predetermined weight. But when some strands are relatively long and others are relatively short and still others are of random intermediate lengths, it becomes virtually impossible to measure out predetermined weights, by simply counting strands.

It is the principal object of this invention to provide a machine which automatically cuts spaghetti to precise predetermined lengths, weighs predetermined weights of the cut spaghetti, and delivers the weighed spaghetti directly to packages or packaging machinery or means adapted to receive the same. Manual handling of the spaghetti is thereby reduced to a minimum. Precise lengths are assured as are precise weights.

It is another object of this invention to cut looped spaghetti to straight lengths of predetermined dimensions. The cutting means which cuts the spaghetti to predetermined lengths is the same cutting means which cuts the bight off the looped spaghetti. The machine herein claimed automatically conveys the removed bights to a collection area or receptacle so that said bights may further be processed or used as desired. It will be understood that the looped spaghetti is mounted, in conventional manner, on supporting rods or sticks. The loops or bights are formed upon and around said rods or sticks in the normal process of hanging and drying. In the machine herein claimed, the rods or sticks are used as anvils or cutting blocks against which the cutting action takes place. Stated differently, these rods or sticks support the spaghetti during the cutting operation.

Important features of the machine relative to said rods or sticks are the following: In the first place, means is provided for straightening these rods or sticks for the cutting operation. Normally, the weight of the spaghetti on these rods or sticks tends to cause them to bend or sag and it is necessary to straighten them out in order to ensure cutting precisely equal lengths of spaghetti. This the machine herein claimed does. Straightening means engage the rods or sticks and hold them straight until the conclusion of the cutting operation. Following the cutting operation, the rods or sticks are released and conveyed to a place where they are collected preparatory to being used again.

It is common knowledge that spaghetti, when ready for the cutting operation, is extremely brittle and fragile. It is, therefore, an important object of this invention to provide mechanism for performing all the necessary operations upon the spaghetti with as little disturbance as possible of the spaghetti strand formation from the time it is initially placed on the table of the machine until the cut strands are delivered from the weighing scales to the means adapted to receive them for packaging.

The invention is illustrated in the accompanying drawings in which:

Fig. 1 is a front view of the machine herein claimed, showing the means which conveys the cut lengths of spaghetti to a weighing mechanism and showing said weighing mechanism.

Fig. 2 is a fragmentary top view thereof.

Fig. 3 is a fragmentary schematic view showing the electrical diagram of the weighing mechanism.

Fig. 4 is a side view of the machine herein claimed, this being also an end view of the conveying mechanism shown in Fig. 1.

Fig. 5 is a fragmentary front view of the machine.

Fig. 7 is a fragmentary front view, drawn to an enlarged scale, more or less diagrammatically showing a slight modification of the spaghetti hopper shown in Fig. 1.

Figure 6:
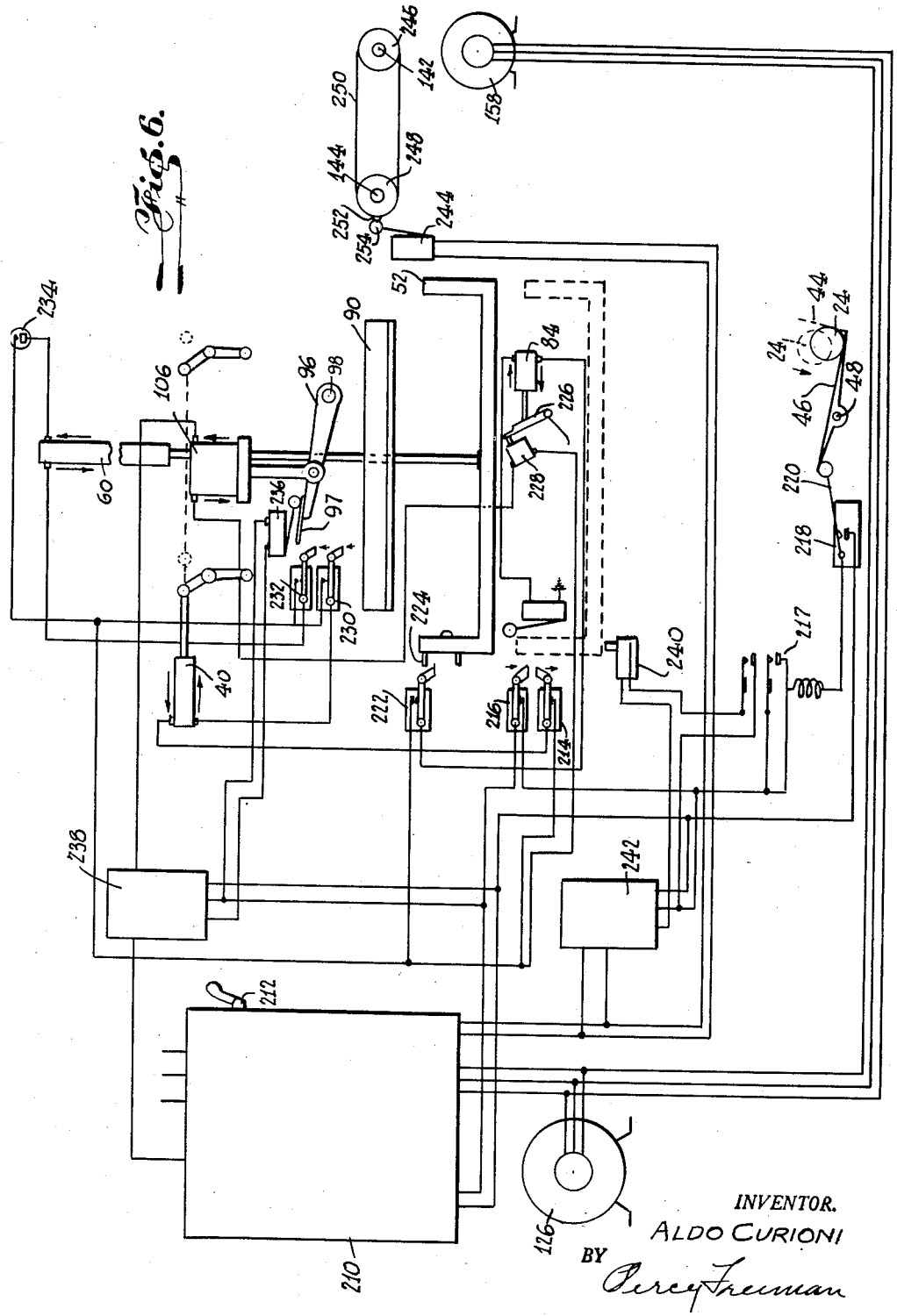
Fig. 6 is an electrical diagram of the machine, including schematic views of components of said machine.

The machine herein claimed consists of three mechanisms which function together to produce a single end result. The first mechanism is the spaghetti-cutting machine proper 10. The second is the conveying mechanism 12 which conveys the cut spaghetti from the cutting machine to the weighing mechanism 14 which is the third mechanism in the machine.

Referring now to the first mechanism, namely, the cutting machine 10, it will be seen that this machine has a base 16 and a frame 18 mounted on said base. Supported on base 16 is a table 20 which is adapted to support spaghetti 22. The spaghetti comes in long strands which are looped around a wooden stick or rod 24 from which they normally hang to dry. When they are dry, they are carried to table 20 by means of the very same stick 24 on which they dried and they are placed flat upon the table, save for their respective bights 26, as is clearly shown in Fig. 4. The stick 24 is placed in abutment with arms 28 and arms 30 then swing downwardly into abutment with the same stick 24 diametrically opposite arms 28. Both sets of arms may be provided with concave recesses such as recesses 32 in arms 30 to receive stick 24 and to hold it firmly in place. Arms 28 may be designated as stop members against which stick 24 must be placed if the spaghetti is to be cut to precisely uniform lengths as hereinafter described. Arms 30 may be described as straightening arms since their function is to straighten stick 24 against stop arms 28.

It will be observed that stop arms 28 are pivotally mounted on horizontal shaft 34 which is supported by frame 18. Connected to stop arms 28 are links 36 which, in turn, are connected to piston rods or plungers 38 projecting from pneumatic cylinders 40. Cylinders 40 are connected to a suitable source of compressed air by means of pipe system 42. When the pneumatic cylinders 40 are energized so as to thrust piston rods or plungers 38 forwardly (to the right as viewed in Fig. 4) stop arms 28 are caused to move into their Fig. 4 positions to serve as stops for stick 24. When the pneumatic cylinders 40 are actuated to retract piston rods or plungers 38, stop arms 28 are caused to swing backwardly (leftwardly as viewed in Fig. 4) and stick 24 is thereby enabled to fall down chute 44 to a pivoted platform 46. This occurs following the cutting operation hereinafter described and the electric circuit which this procedure requires will also hereinafter be described. It suffices to say here, however, that pivoted platform 46 controls a master switch which governs the entire electrical apparatus of the machine. It is only when stick 24 falls upon platform 46 and causes said platform to pivot about its fulcrum 48 that the electrical system is free to operate the machine. Should it happen, perchance, that stick 24 is not properly released from its Fig. 4 position and does not fall to platform 46, the electrical system will not be free to function.

In my co-pending patent application, stick 24 is moved manually across the table to a position corresponding to its Fig. 4 position in the present case. The present machine, however, provides mechanical means for moving stick 24 across the table and into engagement with stop arms 28. This mechanical means includes a pair of arms 50 which depend from a carriage 52. At the lower ends of arms 50 are fingers 54 which project horizontally rearwardly and are adapted to support stick 24 as Fig. 4 clearly shows. Carriage 52 is mounted for horizontal movement both forwardly and rearwardly (rightwardly and leftwardly as viewed in Fig. 4). A rod 56 is secured at its forward end to a bracket 58 at the forward end of carriage 52. The back end of rod 56 projects into a long pneumatic cylinder 60 and therein either serves as or is connected to a plunger or piston of conventional design. Pneumatic cylinder 60 is connected to a source of compressed air by means of pipe 62. The pipe connections and valves are all conventional not only in connection with pneumatic cylinder 60 but also in connection with all of the other pneumatic cylinders shown in the drawings, all of which may, if desired, be connected to a single source of compressed air (not shown). When pneumatic cylinder 60 is actuated so as to draw rod 56 rearwardly, carriage 52 is also caused to move rearwardly (in the direction of the arrow in Fig. 4) and to carry stick 24 to its solid line position against stop arms 28. It is at this point that straightening arms 30 are swung into engagement with said stick 24 to straighten it out against said stop arms 28.

The means for moving straightening arms 30 into operative position against stick 24 is the carriage 52 itself. Straightening arms 30 are pivotally mounted on a shaft 64 which is supported on frame 18. Bumper or bumpers 66 are provided on carriage 52 for engagement with straightening arms 30 when the carriage is caused to move rearwardly with its stick 24. Bumper or bumpers 66 engage the straightening arms as Fig. 4 clearly shows and cause said arms to swing downwardly and rearwardly (leftwardly as viewed in Fig. 4). It will be understood that stick 24 is moved into position behind straightening arms 30 before these straightening arms are swung into engagement therewith. It is the progressive movement of the carriage which first brings stick 24 into position adjacent stop arms 28 and then brings straightening arms 30 into engagement with said stick and the final action in this progressive procedure takes place when the carriage and the straightening arms 30 which it engages push stick 24 into engagement with stop arm 28, thereby straightening the stick and holding it in operative position for the cutting operation.

Following the cutting operation, it is necessary for straightening arms 30 to disengage stick 24 and to move forwardly and upwardly to inoperative position preparatory to starting the next cycle. The means for returning these arms 30 to inoperative position is shown in Figs. 1 and 4. A bracket 68 is secured to shaft 64 and secured to said bracket is a spring 70 which is hooked at its lower end into a second bracket 72. Bracket 72 is secured to frame 18 of the machine and the action of spring 70 is to turn shaft 64 in counter-clockwise direction as viewed in Fig. 4. Since straightening arms 30 are also secured to shaft 64, the effect of this spring action is to swing said arms 30 in counterclockwise direction as viewed in Fig. 4 to disengage stick 24 and to move into inoperative position. When said arms 30 are pushed into operative position by carriage 52, this is done against the action of spring 70.

An important feature of the invention is the relatively soft plastic or rubber presser foot 74 which rests upon the spaghetti during the cutting operation in order to hold it in place and prevent it from jumping. This presser foot is supported by means of brackets 76 on shaft 78. Brackets 76 are made of spring material so as to enable the presser foot to exert spring pressure against the spaghetti. A crank arm 80 is secured to shaft 78 and it is also connected to a plunger or piston rod 82 projecting from pneumatic cylinder 84. A pipe 86 connects pneumatic cylinder 84 to the source of compressed air (not shown). When pneumatic cylinder 84 is energized or actuated to thrust plunger 82 forwardly (rightwardly as viewed in Fig. 4) crank arm 80 is caused to swing in clockwise direction in Fig. 4 to bring the presser foot into engagement with the spaghetti. When pneumatic cylinder 84 is energized in the opposite direction, crank arm 80 is caused to swing in counter-clockwise direction as viewed in Fig. 4 and the presser foot disengages the spaghetti.

The cutting means for cutting the spaghetti to predetermined lengths consists of two mechanisms. The first includes a pair of knives or cutters 88 and 90 respectively. These knives extend across the width of the machine. Knife 88 is the lower knife and it is fixedly secured to the frame 18 of the machine. The other knife 90 is situated above the lower knife 88 and it is slidably mounted in channels or tracks 92 on the frame of the machine. Knife 90 functions in the manner of a guillotine. It moves downwardly into cutting engagement with the spaghetti and it moves upwardly into inoperative position. The means for causing knife 90 to move in either direction is a pair of adjustable knife holders 94 which abut or are connected to a pair of crank arms 96. These crank arms are pivotally mounted on shaft 98 which is supported on frame 18 of the machine. A link 100 is connected by means of shaft 102 to the two crank arms 96 and said link is also connected to a plunger or piston rod 104 projecting from pneumatic cylinder 106. This pneumatic cylinder is connected to the source of compressed air by means of pipe 108. The solenoid control valves of cylinders 40, 60, 84 and 106 are well known and are not believed to require further description. They are of the reversing type of solenoid which operates the valves and the cylinders by moving the valve in one position to open the inlet and then moving the valve in the opposite direction to open the outlet. This enables the plungers in the cylinder to move in one or the other direction.

Closing the electric circuit to any of the solenoid valves may suck in the armature to move the valve in one direction and a cutting off of current may permit a spring to return the armature to initial position. When this pneumatic cylinder is energized to thrust plunger 104 downwardly, the effect is to push link 100, shaft 102, crank arms 96, knife holders 94 and knife 90 downwardly. Upward movement of the same assembly may be effected by reversing the action of the pneumatic cylinder 106 in conventional manner or springs may be provided to retract said assembly to elevated inoperative positions when the pneumatic cylinder is de-energized. It will be understood that when the upper knife 90 is brought down upon the spaghetti, it acts through the spaghetti and stick 24 to apply pressure upon the lower knife 88. The two knives thereupon are unabled to cooperate in cutting the upper and lower runs of the spaghetti on diametrically opposite sides of stick 24. The bights of the spaghetti are thereby removed therefrom and they fall down chute 44 to a collecting receptacle. When knife 90 is retracted to inoperative position, stop arms 28 are caused to disengage stick 24 and said stick is thereby enabled to drop down through chute 44 to the pivoted platform 46 above mentioned.

It will now be noted that a pair of conveyor belts 110 and 112 are provided, transversely of the machine, and these conveyor belts are mounted at their respective ends on drums 114 and 116. Drums 114 are mounted on shaft 118 supported by bearings 120 on base 16. Drums or rollers 116 are mounted on a shaft 122 which is supported by frame 124 on main frame 18 of the machine. An electric motor 126, mounted on bracket 128 on base 16 is connected by means of a drive belt 130 to a pulley 132 on shaft 118. When the motor is in operation, said shaft 118 and the drums 114 thereon are caused to rotate in the direction of the curved arrow 134 in Fig. 1. This causes the two conveyor belts 110 and 112 to move in the direction of arrow 136 in Fig. 1. It will now be understood that these two conveyor belts, and more particularly their upper runs, extend across table 20 of the machine and they are in direct contact with the spaghetti which is brought into proper position for the cutting operation above described. In other words, those portions of the spaghetti which are disposed immediately above and in contact with conveyor belts 110 and 112 are supported by said conveyor belts and when the conveyor belts are caused to move as above indicated, the spaghetti is carried along on said belts in the direction of arrow 136 in Fig. 1.

A plurality of belts 140 are provided above conveyor belts 110 and 112. These belts 140 are mounted on shafts 142 and 144 in frame or frames 146. Shaft 142 is supported on bearings 148 which are mounted on frame 124. Gear wheels 149 are secured to the two shafts 142 of belts 140 and 122 of conveyor belts 110 and 112. These gears are in mesh with each other so that when the conveyor belts 110 and 112 are driven by the means hereinabove described, belts 140 will also be caused to move in synchronization therewith and at the same linear speed. Belts 140 rest upon the spaghetti on conveyor belts 110 and 112. A plurality of pins 150 are provided on belts 140 for engagement with said spaghetti. As conveyor belts 110 and 112 carry the spaghetti to and past the next cutting station, these pins tend to hold the spaghetti in substantially perfect parallelism, at right angles to the direction of movement of said spaghetti. This is essential for accurate cutting of the spaghetti in the next stage of the process.

The spaghetti is now properly positioned for the next cutting operation. This cutting operation takes place when a circular saw 152 engages the spaghetti at right angles thereto, between the two belts 110 and 112, and cuts the spaghetti asunder. Circular saw 152 is mounted on a shaft 154 which is supported by bearings 156. These bearings are mounted on frame 124, as is electric motor 158. When the electric motor is in operation, the saw will rotate in cutting engagement with the spaghetti and will sever the spaghetti at a predetermined point equidistant from its respective ends, unless it be desired to cut the spaghetti into two groups or runs of different lengths. As the cut spaghetti continues to move on conveyor belts 110 and 112, a wedge 160 is encountered in the severed area and the spaghetti is thereby cammed sidewardly in opposite directions as it moves forwardly.

It will be seen that when the spaghetti leaves the two conveyor belts 110 and 112 it falls into a pair of hoppers 162. These hoppers are open at the bottom but a door 164 is provided to prevent the spaghetti from falling out. The door is pivoted on pintle 166 and on the other side of said pintle is an arm 168 which is connected to the plunger 170 of a solenoid 172. When this solenoid is energized to draw plunger 170 upwardly, the door is caused to open and the spaghetti is permitted to fall out of the hopper. When the solenoid 172 is de-energized as hereinafter described, door 164 is caused to close and the spaghetti is prevented from dropping out of the hopper.

Below each hopper 162 is a second hopper 174. This hopper is also open at the bottom but a door 176 is provided to close the same. Hopper 174 is mounted on a scale or balance 178 which is mounted on a frame or base 180. The scale or balance is adjustable to any desired weight by simply adding weights to or removing them from its platform 182. Said platform is opposite hopper 174, that is, on the opposite side of the fulcrum 184 of the scale or balance 178. When spaghetti is permitted to fall into hopper 174, a time will come when the weight of the spaghetti corresponds to the unbalanced weight on the opposite side of fulcrum 184. When this happens, as will hereinafter be seen, door 164 to the upper hopper closes to prevent a further flow of spaghetti into the lower hopper 174. Door 176 of the lower hopper is now caused to open and the weighed spaghetti falls upon chute 186 and thence into a rack 188. From rack 188 the spaghetti is removed to a suitable package or container by means not shown in the drawings. This may be done manually, if desired.

The mechanism for opening and closing door 176 is shown in Fig. 1. A solenoid 190 is provided on a platform 192 on the opposite side of fulcrum 184 from platform 182. A plunger 194 projects upwardly from said solenoid 190 into engagement with a forked arm 196 pivotally secured to hopper 174 by shaft 199. Door 176 is pivotally secured to said hopper by means of pintle or pintles 198. Pivotally secured to said door by means of pin 200 is a link 202. The opposite end of the link 202 is pivotally secured by pin 204 to crank arm 201 which is keyed to shaft 199. It is clear, therefore, that when the solenoid is energized, the door 176 is pivoted to open the hopper 174 and to allow the spaghetti to drop onto chute 186.

The electrical circuit for the mechanism above described is clearly shown in Fig. 6. It will there be seen that a control box 210 is provided with a main switch 212 which controls the apparatus, including an electric circuit. This circuit includes a pair of switches 214 and 216 respectively which are actuated by the traveling carriage 52. Switch 214 is normally open and switch 216 is normally closed. The contact members on these two switches are pivotally disposed in such manner that the carriage actuates only switch 216 on its movement toward the rear of the machine and only switch 214 on its movement toward the front of the machine. Consequently, switch 216 is actuated first and it is opened temporarily by the rearwardly moving carriage to energize the safety control or release mechanism until it is restored by the dropping of the stick 24 upon platform 46. It will thus be seen that switch 216 controls a circuit which includes a relay controlled switch 217 and switch 218 shown at the bottom of Fig. 6. Switch 218 is normally closed in the sense that it is required to be closed during part of the operation of the machine but it tends to open when permitted to do so. Platform 46 engages switch arm 220 of switch 218 which comprises a spring arm normally holding a movable contact out of engagement with a stationary contact, and tends to hold said switch arm in position to close the circuit through switch 218. When a stick 24 drops on platform 46, however, the platform pivots and releases spring arm 220, thereby permitting switch 218 to open. Switch 214, on the other hand, is connected to a solenoid control valve in pneumatic cylinder 40 to control the operation of said cylinder and the stop arm 28 to which it is connected. This is done on the forward movement of the carriage when it is desired to retract arms 28 and release the stick. As the stick falls on platform 46, the apparatus is freed for the next cycle. Another switch 222 is situated in the path of the traveling carriage and more particularly in the path of projections 224 on said carriage. This switch 222 is normally open and it is actuated by the carriage on its rearward movement. This switch controls a circuit which includes the solenoid valve in pneumatic cylinder 84, thereby controlling the presser foot 74. A pivoted arm 226 is connected to pneumatic cylinder 84 for engagement with a switch 228. This switch controls a circuit which includes pneumatic cylinder 106 and more particularly its solenoid control valve. Now that the presser foot firmly holds the spaghetti, pneumatic cylinder 106 is energized to actuate knife 90 and thereby to sever the spaghetti.

There are two switches in the path of knife 90 when said knife is retracted to inoperative position. One is switch 230 and the other is switch 232. Switch 230 is actuated first by the upwardly moving knife and it controls a circuit which includes the solenoid control valve of pneumatic cylinder 40, thereby retracting arms 28 and permitting the stick 24 to fall. The upwardly moving knife 90 now engages switch 232 and closes said switch and it will be observed that said switch controls a circuit which includes the solenoid control valve of pneumatic cylinder 60 which controls the movement of the carriage. A starting switch 234 is provided in the circuit for manually controlling said circuit.

It will be observed in Figs. 4 and 6 that arm 96 is provided with an extension piece 97 which actuates the switch arm of a switch 236. Switch 236 controls a circuit which includes a delaying relay 238 which has the effect of delaying the movement of knife 90 until the stick 24 is fully straightened out by straightening arms 30. Still another switch 240 is provided for starting the conveyor belt motor 126. This is necessary in order to start the mechanism for conveying the cut spaghetti to the saw and this switch 240 is actuated by the carriage 52 only when the carriage is moved forwardly to its starting position after having placed a stick 24 in cutting position. This switch 240 controls a circuit which includes a time relay 242 which temporarily closes a switch 244 hereinafter referred to. Also included in the latter circuit is the control box 210 and a circuit which includes conveyor belt motor 126 and saw motor 158. It will be observed that these two motors are, in the preferred form of this invention, three-phase motors which feed on the same circuit so that when said circuit is closed both motors are simultaneously energized and conversely when said circuit is opened both motors are simultaneously de-energized.

Mounted on shafts 142 and 144 above mentioned is a pair of pulleys 246 and 248 respectively and a belt 250 is mounted on said pulleys. Belt 250 is movable at the same speed and in the same direction as belts 140 above mentioned and this would also correspond to the speed of movement of conveyor belts 110 and 112. A projection or protuberance 252 is provided on belt 250 and this projection or protuberance is engageable with switch arm 254 of switch 244 above mentioned. The switch is actuated once for each complete cycle of movement of projection 252. When this happens switch 244 opens and the circuit which it controls is thereby also opened. This circuit leads to the control box 210 and controls the circuit in which motors 126 and 158 are situated. This latter circuit is thereby also opened to stop these motors and thereby to stop conveyor belts 110 and 112. Now that these belts are stopped, it is possible to bring a new stick 24 carrying a new load of spaghetti into operative position across the belts ready for the cutting operation first above mentioned.

Turning now to Fig. 3, it will be noted that a switch 256 is provided on the weighing mechanism 14 to control the same. The scale may be set to any predetermined weight such as one pound. Switch 256 is normally closed since the left side of the scale as viewed in the drawing is heavier than the right side and the balance tends to swing in counter-clockwise direction. Switch 256 controls a circuit which includes solenoid 172 and electric cord 258 which may be connected to a suitable source of electric current. Since switch 256 is normally closed, solenoid 172 is normally energized and door 164 is normally open. The spaghetti is free to fall out of hopper 162 and into hopper 174. When the spaghetti in hopper 174 attains the predetermined weight of one pound, the scale will be unbalanced and it will swing in clockwise direction about fulcrum 184 as viewed in the drawing and switch 256 will open. This will de-energize solenoid 172 and door 164 will close. When this happens, the plunger of solenoid 172 will strike a switch 260 which is normally open and will close said switch. Switch 260 controls a circuit which includes solenoid 190. When the latter circuit is closed, solenoid 190 will be energized and hopper 174 will open, thereby dropping its contents into receptacle 188. As soon as this happens, the scale will swing in counter-clockwise direction until switch 256 is closed. This will energize solenoid 172, thereby opening door 164 and renewing the cycle.

In Fig. 7 there is shown more or less diagrammatically a slight modification of the upper hopper which receives the spaghetti from the conveyor belt. In this instance, the conveyor belt 162f is trained over pulley 162h with its lower run being trained over an idler 162g. It is extremely important that the spaghetti strands formation be maintained with as little disturbance as possible from the time it is initially placed on the table of the machine until the cut strands are delivered from the weighing scales to the means adapted to receive them for packaging. When the spaghetti drops the short distance from the conveyor belt, it is desirable to obviate any likelihood of the spaghetti strands tipping over on end and thus changing their position from the horizontal position which had been maintained up to this point. To assure this continued position of the spaghetti, and facilitate its retaining said position throughout the operation of the machine, a baffle 162b curved concentrically with the pulley 162h is provided as one wall of the hopper. The spaghetti is thus prevented from changing its position, that is from tipping over on end and it is caused to ride down onto the bottom 162c of the hopper, always maintaining the horizontal parallel relationship. The gate of the hopper in this case is pivoted at 162a, supported by the bracket 162e, the rear tail of the gate being connected pivotally to the plunger or solenoid core 170a of the pneumatic cylinder or the solenoid 172a.

The foregoing illustrates a preferred form of this invention and it will be understood that this preferred form may be modified and other forms may be provided within the broad spirit of the invention and the broad scope of the claims.

I claim:

1. A spaghetti cutting machine for cutting spaghetti having bights looped about a rod, comprising a table for supporting the rod and the spaghetti looped about said rod, stop members mounted at one end of said table, a carriage mounted for movement across said table toward and away from said stop members, said carriage being provided with means for holding said rod to carry it into engagement with said stop members, rod straightening means mounted for engagement with said rod to clamp it straight against said stop members, and knives mounted parallel with said rod for engagement with the spaghetti looped about said rod to cut said spaghetti and thereby to remove the bights therefrom.

2. A spaghetti cutting machine in accordance with claim 1, wherein the stop members are pivotally mounted for movement into and out of stopping position relative to the spaghetti carrying rod, said stop members being swingable into stopping position to receive said rod from said carriage and to hold the rod in operative position for the cutting operation in cooperation with said rod straightening means, said stop members being swingable out of engagement with said rod at the conclusion of the cutting operation to free said rod for removal from the cutting machine.

3. A spaghetti cutting machine in accordance with claim 2, wherein a chute is provided below said spaghetti carrying rod when said rod is in operative position for the cutting operation, whereby disengagement of said rod by said stop members enables said rod to drop down the chute, a switch being provided at said chute for engagement with said rod, means connecting said switch to said carriage, whereby engagement of said switch by said rod releases the carriage for further movement in the next cycle of the machine.

4. A spaghetti cutting machine in accordance with claim 1, wherein one of the knives is stationary and is situated below the spaghetti carrying rod when said rod is in operative position for the cutting operation, and a second knife is a guillotine mounted for vertical movement toward and away from said rod on the opposite side thereof from the stationary knife.

5. A spaghetti cutting machine in accordance with claim 1, wherein a presser foot is movably mounted on said machine for movement into and out of engagement with the spaghetti which is disposed across the table to hold said spaghetti in place during the cutting operation.

References Cited in the file of this patent

UNITED STATES PATENTS

| | | |
|---|---|---|
| 2,455,433 | Matsen et al. | Dec. 7, 1948 |
| 2,649,056 | Autenrieth | Aug. 18, 1953 |
| 2,650,816 | Stock | Sept. 1, 1953 |
| 2,661,181 | Stock | Dec. 1, 1953 |